US009680650B2

(12) United States Patent
Jose et al.

(10) Patent No.: US 9,680,650 B2
(45) Date of Patent: Jun. 13, 2017

(54) SECURE CONTENT DELIVERY USING HASHING OF PRE-CODED PACKETS

(71) Applicant: QUALCOMM Incorporated, San Diego, CA (US)

(72) Inventors: Jubin Jose, Bound Brook, NJ (US); Xinzhou Wu, Monmouth, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/148,342

(22) Filed: Jan. 6, 2014

(65) Prior Publication Data

US 2015/0058625 A1 Feb. 26, 2015

Related U.S. Application Data

(60) Provisional application No. 61/869,429, filed on Aug. 23, 2013.

(51) Int. Cl.
*H04L 29/06* (2006.01)
*H04L 9/32* (2006.01)
(Continued)

(52) U.S. Cl.
CPC .......... *H04L 9/3242* (2013.01); *H04L 9/3236* (2013.01); *H04L 9/3247* (2013.01); *H04L 9/3268* (2013.01); *H04L 63/0428* (2013.01); *H04L 63/12* (2013.01); *H04L 67/12* (2013.01); *H04L 2209/24* (2013.01); *H04L 2209/72* (2013.01); *H04L 2209/80* (2013.01); *H04L 2209/84* (2013.01); *H04W 4/008* (2013.01); *H04W 4/046* (2013.01)

(58) Field of Classification Search
None
See application file for complete search history.

(56) References Cited

U.S. PATENT DOCUMENTS 5,473,607 A * 12/1995 Hausman ............ H04L 12/4625
370/392
8,522,013 B2 8/2013 Zhang et al.
(Continued)

FOREIGN PATENT DOCUMENTS

WO WO-02101971 A2 12/2002

OTHER PUBLICATIONS

ISA/EPO, International Search Report and Written Opinion of the International Searching Authority, Int'l App. No. PCT/US2014/050521, Nov. 13, 2014, European Patent Office, Rijswijk, NL, 12 pgs.

(Continued)

*Primary Examiner* — Malcolm Cribbs
(74) *Attorney, Agent, or Firm* — Holland & Hart LLP

(57) ABSTRACT

Methods, systems, and devices are described for securing content for delivery via a communications network. The methods, systems and devices may involve coding a plurality of packets using a determined code to generate a coded set of packets. A plurality of packets of the coded set of packets may be hashed to generate a plurality of hashes. The plurality of hashes may be transmitted via the communications network to deliver the secured content.

30 Claims, 15 Drawing Sheets

(51) Int. Cl.
*H04W 4/00* (2009.01)
*H04L 29/08* (2006.01)
*H04W 4/04* (2009.01)

(56) References Cited

U.S. PATENT DOCUMENTS

| | | | |
|---|---|---|---|
| 9,100,799 B1* | 8/2015 | Thiagarajan | H04W 4/06 |
| 2001/0053226 A1* | 12/2001 | Akins, III | H04N 21/63345 380/282 |
| 2002/0142730 A1* | 10/2002 | Hsu | H04L 12/1877 455/72 |
| 2002/0154631 A1* | 10/2002 | Makansi | H04L 63/18 370/389 |
| 2002/0178187 A1* | 11/2002 | Rasmussen | H04L 63/12 715/234 |
| 2002/0194484 A1* | 12/2002 | Bolosky | G06F 21/64 713/189 |
| 2003/0123389 A1* | 7/2003 | Russell et al. | 370/230 |
| 2003/0229786 A1* | 12/2003 | Hollis | H04L 63/123 713/168 |
| 2004/0059908 A1* | 3/2004 | Yamada | H04L 9/003 713/151 |
| 2004/0123330 A1* | 6/2004 | Cho et al. | 725/131 |
| 2005/0235154 A1* | 10/2005 | Serret-Avila | G06F 21/64 713/176 |
| 2005/0259813 A1* | 11/2005 | Wasilewski et al. | 380/28 |
| 2006/0173783 A1* | 8/2006 | Marples | G06F 21/10 705/51 |
| 2006/0235895 A1* | 10/2006 | Rodriguez | H04N 21/631 |
| 2006/0271492 A1* | 11/2006 | Candelore | G06F 21/10 705/57 |
| 2007/0060043 A1* | 3/2007 | Qi et al. | 455/3.02 |
| 2007/0140488 A1* | 6/2007 | Dharmaji et al. | 380/212 |
| 2007/0277035 A1* | 11/2007 | Patel | H04L 9/0822 713/168 |
| 2008/0008159 A1* | 1/2008 | Bourlas et al. | 370/352 |
| 2008/0101598 A1* | 5/2008 | Dillaway | H04L 63/20 380/44 |
| 2008/0134258 A1* | 6/2008 | Goose | H04N 7/17336 725/91 |
| 2008/0151776 A1* | 6/2008 | Kure | 370/253 |
| 2008/0165806 A1* | 7/2008 | Reznik et al. | 370/485 |
| 2008/0235510 A1* | 9/2008 | Wolf | 713/161 |
| 2009/0260057 A1 | 10/2009 | Laberteaux et al. | |
| 2009/0327391 A1* | 12/2009 | Park | H04W 8/005 709/201 |
| 2010/0005288 A1* | 1/2010 | Rao | H04L 1/1854 713/151 |
| 2010/0031042 A1 | 2/2010 | Di Crescenzo et al. | |
| 2010/0088745 A1* | 4/2010 | Song | G06F 21/51 726/2 |
| 2010/0146128 A1* | 6/2010 | Kulkarni et al. | 709/228 |
| 2010/0180316 A1* | 7/2010 | Hasegawa et al. | 725/118 |
| 2010/0195827 A1* | 8/2010 | Lee et al. | 380/200 |
| 2010/0251067 A1 | 9/2010 | Hughes et al. | |
| 2011/0064015 A1* | 3/2011 | Yue et al. | 370/312 |
| 2011/0191581 A1 | 8/2011 | Shim et al. | |
| 2012/0163256 A1* | 6/2012 | Kang | H04L 12/4625 370/310 |
| 2012/0203893 A1* | 8/2012 | Williams et al. | 709/224 |
| 2013/0238962 A1* | 9/2013 | Summerson et al. | 714/795 |
| 2013/0326213 A1* | 12/2013 | Murphy | H04L 63/0428 713/155 |
| 2015/0012745 A1* | 1/2015 | Hertel | H04L 9/3236 713/165 |

OTHER PUBLICATIONS

Wahid et al., "An Optimal Message Authentication Scheme for Lossy Channels," 2006 International Conference on Emerging Technologies, ICET '06, Peshawar, Nov. 13-14, 2006, pp. 443-448, ISBN 1-4244-0502-5, Institute of Electrical and Electronics Engineers.

Nowatkowski, Michael E., Certificate Revocation List Distribution in Vehicular Ad Hoc Networks: A Dissertation Presented to the Academic Faculty, Georgia Institute of Technology, May 2010, 114 pages.

IPEA/EPO, Second Written Opinion of the International Searching Authority, Int'l. App. No. PCT/US2014/050521, Aug. 10, 2015, European Patent Office, Munich, DE, 7 pgs.

* cited by examiner

SECURE CONTENT DELIVERY USING HASHING OF PRE-CODED PACKETS

CROSS REFERENCES

This application claims priority from U.S. Provisional Patent Application No. 61/869,429 entitled "SECURE CONTENT DELIVERY USING HASHING OF PRE-CODED PACKETS," which was filed Aug. 23, 2013.

BACKGROUND

The following relates generally to communications, and more specifically to providing secure content delivery via a communications network. Communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of wireless multiple-access systems include code-division multiple access (CDMA) systems, time-division multiple access (TDMA) systems, frequency-division multiple access (FDMA) systems, and orthogonal frequency-division multiple access (OFDMA) systems.

As described herein, a dedicated short range communications (DSRC) network may require secure content delivery, for example, for distribution of a certificate revocation list (CRL), created by a certificate authority, to all vehicles using the DSRC network. The CRL provides a list of revoked certificates so that vehicles can identify received communications not to trust. Dissemination of the CRL is to be secure so that malicious or incorrect packets are not forwarded by vehicles using the DSRC network.

SUMMARY

The described features generally relate to one or more improved systems, methods, and/or apparatuses for securing content for delivery via a communications network. In particular, the described features relate to secure content delivery via a dedicated short range communications (DSRC) network.

A method of securing content for delivery via a communications network is described. In one configuration, the method may involve coding a plurality of packets using a determined code to generate a coded set of packets, and hashing a plurality of packets of the coded set of packets to generate a plurality of hashes.

In some embodiments, the method may involve selecting at least one packet of the coded set of packets. In such embodiments, the at least one selected packet may be broadcast over a wireless communications network. Further, the at least one signed and/or encrypted packet may be transmitted independently of the broadcasting of the selected packet. In some embodiments, the at least one packet of the coded set of packets may be randomly selected.

In some embodiments, the coding of the plurality of packets may involve determining a number of packets (k) in the plurality of packets, and coding the k packets using the determined code to generate a number of packets (m) in the coded set of packets, with m being greater than k. In such embodiments, the number of packets (m) in the coded set of packets may be determined so that a subset of the coded set of packets with at least k packets is sufficient to recover the k packets in the plurality of packets. Alternatively or additionally, the number of packets (m) in the coded set of packets may be determined based at least in part on an overhead associated with transmitting the plurality of hashes via a communications network.

In some embodiments, the method may involve transmitting the plurality of hashes via a communications network, and transmitting k, m and the determined code via the communications network.

In some embodiments, the method may involve randomly selecting at least one packet of the coded set of packets. The at least one selected packet may be broadcast over a wireless communications network. In such embodiments, the number of packets (m) in the coded set of packets may be determined based at least in part on an overhead associated with the broadcasting of the at least one randomly selected packet over the wireless communications network.

In some embodiments, the plurality of hashes may be transmitted via a communications network. In such embodiments, the plurality of hashes may be wirelessly transmitted. Alternatively or additionally, the plurality of hashes may be transmitted via a wired backhaul.

In some embodiments, the method may involve combining the plurality of hashes into at least one packet. In such embodiments, the at least one packet may be signed with an electronic signature. Alternatively or additionally, the at least one packet may be encrypted. Further in such embodiments, the method may involve transmitting the at least one packet via a communications network.

An apparatus for securing content to be delivered via a communications network is described. In one configuration, the apparatus may include means for coding a plurality of packets using a determined code to generate a coded set of packets, and means for hashing a plurality of packets of the coded set of packets to generate a plurality of hashes.

A device configured to secure content for delivery via a communications network is described. In one configuration, the device may include a processor and memory in electronic communication with the processor. Instructions may be stored in the memory. The instructions may be executable by the processor to: code a plurality of packets using a determined code to generate a coded set of packets; and, hash a plurality of packets of the coded set of packets to generate a plurality of hashes.

A computer program product for securing content for delivery via a communications network is described. The computer program product may be a non-transitory computer-readable storage medium storing instructions. The instructions may be executable by a processor to code a plurality of packets using a determined code to generate a coded set of packets, and hash a plurality of packets of the coded set of packets to generate a plurality of hashes.

A method of secure content delivery via a communications network is also described. In one configuration, the method may involve receiving a plurality of hashes corresponding to a coded set of packets via a wireless communications network, and receiving an electronic signature associated with the plurality of hashes. The received plurality of hashes may then be verified based at least in part on the received electronic signature.

Another method of secure content delivery via a wireless communications network is described. In one configuration, the method may involve receiving a plurality of hashes corresponding to a coded set of packets via a communications network, and receiving a packet of the coded set of packets via the communications network. The received packet may then be hashed to generate a hash of the received packet. The hash of the received packet may then be compared with a corresponding hash of the received plurality of hashes to verify the received packet.

Yet another method of secure content delivery via a communications network is described. In one configuration, the method may involve receiving a plurality of hashes corresponding to a coded set of packets via a communications network, wherein the plurality of hashes are encrypted with an encryption. The received plurality of hashes may then be verified based at least in part on the encryption.

An apparatus for secure content delivery via a communications network is described. The apparatus may include means for receiving a plurality of hashes corresponding to a coded set of packets via a communications network, means for receiving an electronic signature associated with the plurality of hashes, and means for verifying the received plurality of hashes based at least in part on the received electronic signature.

A device for secure content delivery via a communications network is described. The device may include a processor, memory in electronic communication with the processor, and instructions stored in the memory. The instructions may be executable by the processor to receive a plurality of hashes corresponding to a coded set of packets via a communications network, receive an electronic signature associated with the plurality of hashes, and verify the received plurality of hashes based at least in part on the received electronic signature.

A computer program product for secure content delivery via a communications network is described. The computer program product may be a non-transitory computer-readable storage medium storing instructions. The instructions may be executable by a processor to receive a plurality of hashes corresponding to a coded set of packets via a wireless communications network, receive an electronic signature associated with the plurality of hashes, and verify the received plurality of hashes based at least in part on the received electronic signature.

Another apparatus for secure content delivery via a communications network is described. The apparatus may include means for receiving a plurality of hashes corresponding to a coded set of packets via a communications network, means for receiving a packet of the coded set of packets via the communications network, means for hashing the received packet to generate a hash of the received packet, and means for comparing the hash of the received packet with a corresponding hash of the received plurality of hashes to verify the received packet.

Another device for secure content delivery via a communications network is described. The device may include a processor, memory in electronic communication with the processor, and instructions stored in the memory. The instructions may be executable by the processor to receive a plurality of hashes corresponding to a coded set of packets via a communications network, receive a packet of the coded set of packets via the communications network, hash the received packet to generate a hash of the received packet, and compare the hash of the received packet with a corresponding hash of the received plurality of hashes to verify the received packet.

Another computer program product for secure content delivery via a communications network is described. The computer program product may be a non-transitory computer-readable storage medium storing instructions. The instructions may be executable by a processor to receive a plurality of hashes corresponding to a coded set of packets via a communications network, receive a packet of the coded set of packets via the communications network, hash the received packet to generate a hash of the received packet, and compare the hash of the received packet with a corresponding hash of the received plurality of hashes to verify the received packet.

Another apparatus for secure content delivery via a communications network is described. The apparatus may include means for receiving a plurality of hashes corresponding to a coded set of packets via a communications network. The plurality of hashes may be encrypted with an encryption. The apparatus may further include means for verifying the received plurality of hashes based at least in part on the encryption.

Another device for secure content delivery via a communications network is described. The device may include a processor, memory in electronic communication with the processor, and instructions stored in the memory. The instructions may be executable by the processor to receive a plurality of hashes corresponding to a coded set of packets via a communications network. The plurality of hashes may be encrypted with an encryption. The instructions may further be executable by the processor to verify the received plurality of hashes based at least in part on the encryption.

Another computer program product for secure content delivery via a communications network is described. The computer program product may be a non-transitory computer-readable storage medium storing instructions. The instructions may be executable by a processor to receive a plurality of hashes corresponding to a coded set of packets via a communications network. The plurality of hashes may be encrypted with an encryption. The instructions may further be executable by a processor to verify the received plurality of hashes based at least in part on the encryption.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
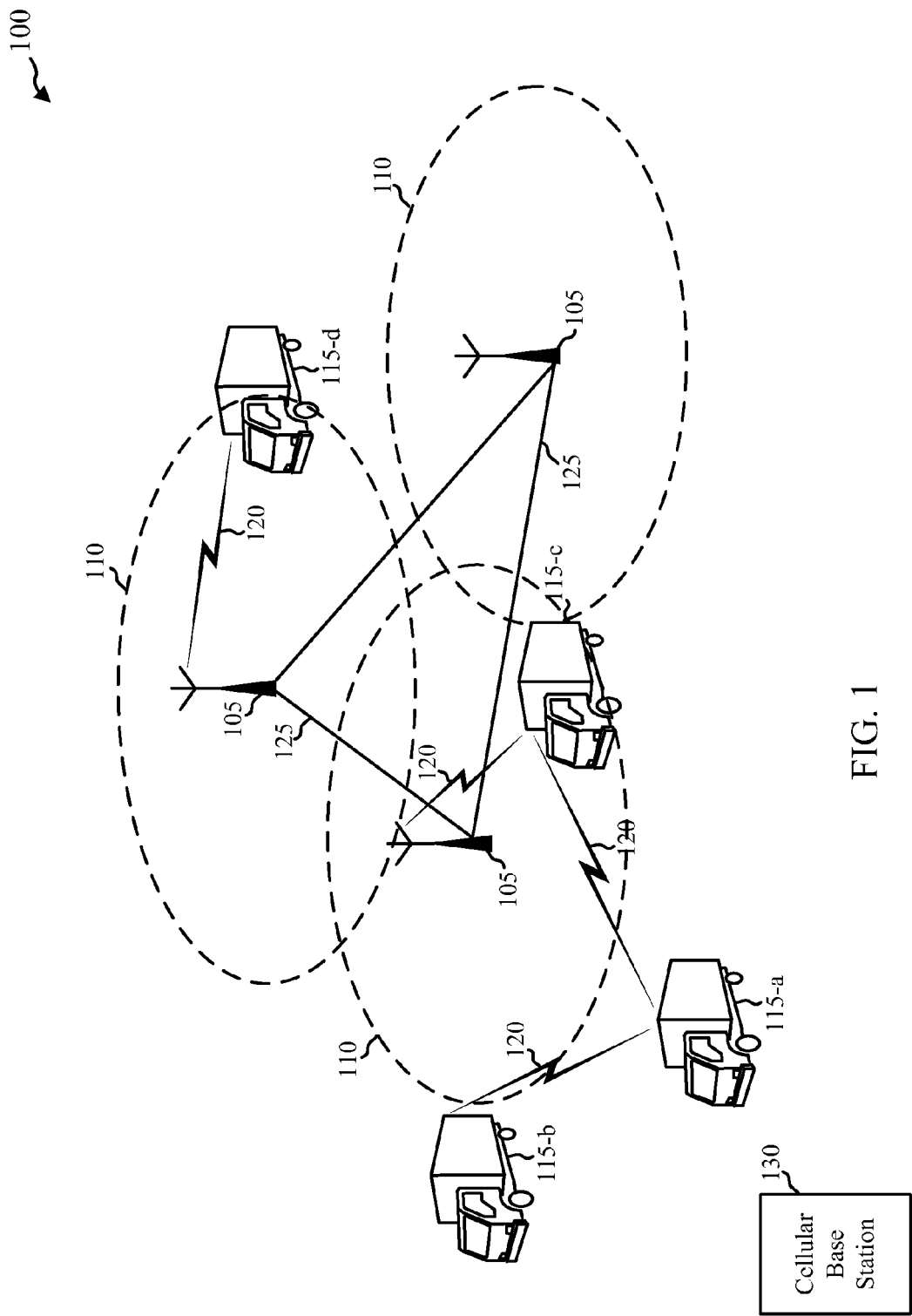
FIG. 1 shows a block diagram of a wireless communications system.

The following description is made with respect to a dedicated short range communications (DSRC) network. It should be understood, however, that the described features may be generally applicable to other communications networks as well, whether wireless, wired or a combination thereof. In the context of a DSRC network in particular, secure content delivery is important to avoid malicious and/or incorrect information packets from being received and forwarded by the vehicles in the DSRC network. Each of the vehicles may be understood more generically as being a user equipment (UE).

A particular goal for a DSRC network is the distribution of a certificate revocation list (CRL). Distribution of a CRL should be secure so that the vehicles in the DSRC network may accurately know which senders of information cannot be trusted. As such, various techniques are described for providing secure content delivery. A general technique may be to code and hash at a source that is to disseminate the CRL, such as at a cellular base station or at a roadside base station of the DSRC network.

In such an approach, a plurality of packets (comprising the CRL in this example) may be coded using a determined code to generate a coded set of packets. A plurality of packets of the coded set of packets may then be hashed to generate a plurality of hashes. In this manner, the content (e.g., the CRL) may be secured for delivery via the DSRC network. The plurality of hashes may then be transmitted via the network. In order to provide additional security, the plurality of hashes may be combined into at least one packet, and then signed with an electronic signature or encrypted. The electronic signature, or the encryption as the case may be, may be used by a vehicle receiving the at least one packet to verify the packet(s). Because the code used by the source may be known by the vehicle, the vehicle may forward the verified packet(s) to another vehicle in the network as well as decode and forward the verified packet(s).

Additionally, the source may randomly select a packet from the coded set of packets and then broadcast the selected packet. The source may continue to randomly select and broadcast packets, as necessary or otherwise desired. Then, any vehicle that has received the coded and hashed packet(s) may receive the selected and broadcast packet(s) and then verify the received packet(s) by: hashing the received packet(s) to generate a hash (or hashes) and comparing the generated hash(es) with a corresponding hash (or corresponding hashes) of the previously received hashes.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes DSRC base stations (e.g., roadside base stations) 105 and DSRC devices (e.g., vehicles) 115-a through 115-d operating within the DSRC spectrum (in a DSRC system, for example). The system 100 may also include a cellular base station 130, which may operate in the U-NII spectrum (in a Wi-Fi communication system, for example). Either one of the DSRC base stations 105 or the cellular base station 130 may operate as a source in the various embodiments described. Further, each of the DSRC devices 115 may be referred to as user equipment (UE), and may be considered to be means for performing the various functions described herein with respect to the devices/UEs.

The DSRC devices 115 may be dispersed throughout the wireless communications system 100, and each DSRC device 115 may be stationary or mobile. A DSRC device 115 may be a vehicle, traffic signal, railroad crossing, base station, cellular phone, a personal digital assistant (PDA), or the like. A DSRC device 115 may be able to communicate with the DSRC base station 105 and other DSRC devices 115. Each DSRC base station 105 may provide communication coverage for a respective DSRC geographical coverage area 110.

The FCC initially allocated the DSRC spectrum for automotive use (e.g., intelligent transportation systems). Examples of DSRC communications include emergency warnings for vehicles, cooperative adaptive cruise control, cooperative collision warning, intersection collision avoidance, electronic parking payments, in vehicle signaling, electronic toll collection, etc. DSRC communication links 120 may be between a DSRC device 115 and a DSRC base station 105 or between a DSRC device 115 and another DSRC device 115. In some cases, DSRC communication links 120 between DSRC devices 115 may occur outside of the coverage area 110 of the DSRC base station 105, such as illustrated between DSRC devices 115-a and 115-b. In some embodiments, the DSRC base stations 105 may communicate, either directly or indirectly, with each other over backhaul links 125, which may be wired or wireless communication links.

The wireless communications system 100 may also support operation on multiple carriers (waveform signals of different frequencies). Multi-carrier transmitters can transmit modulated signals simultaneously on the multiple carriers. For example, each DSRC communication link 120 may be a multi-carrier signal modulated according to the various radio technologies. Each modulated signal may be sent on a different carrier and may carry control information (e.g., reference signals, control channels, etc.), overhead information, data, etc.

As noted above, one of the DSRC base stations 105 or the cellular base station 130 may operate as the source, and may be considered to be means for performing the various functions described herein with respect to the base station or source. In the case of the cellular base station 130, the station 130 may be configured to obtain a certification revocation list (CRL) from a generating authority in the form of a plurality of packets. The cellular base station 130 may then process the plurality of packets by coding with a determined code to generate a set of coded packets. The station 130 may then hash the packets of the coded set to generate a plurality of hashes. Further, the cellular base station 130 may sign the plurality of hashes with an electronic signature, or may encrypt the plurality of hashes, or both. The signed and/or encrypted plurality of hashes may then be transmitted by the base station 130.

The cellular base station 130 may transmit, for example, via WiFi to one of the DSRC base stations 105 and/or to one of the DSRC devices 115, such as DSRC device 115-*a*, as appropriate or desired. In some embodiments, limiting the transmission from the cellular base station 130 to one or a few recipients may help to avoid the relatively high costs associated with depending entirely on a secondary wireless network, such as cellular. This may also facilitate earlier deployment of DSRC for vehicles. When the DSRC device 115-*a* receives this transmission, the device 115-*a* may verify the received plurality of hashes based on the electronic signature, or the encryption, or both. Once verified, the DSRC device 115-*a* may forward, or decode-and-forward, the plurality of hashes to one of more of the DSRC devices 115 that are within range, such as DSRC devices 115-*b* and 115-*c*.

When a DSRC base station 105 receives the transmission of the signed and/or encrypted plurality of hashes from the cellular base station 130, or when the DSRC base station 105 operates as the source, the DSRC base station may transmit the signed and/or encrypted plurality of hashes to a DSRC device 115, such as DSRC device 115-*d*, within its coverage area 110. The DSRC base station may also transmit the signed and/or encrypted plurality of hashes to another DSRC base station, as appropriate or desired, which may then further transmit the hashes.

When the DSRC device 115-*d* receives this transmission, the device 115-*d* may verify the received plurality of hashes based on the electronic signature, or the encryption, or both. Once verified, the DSRC device 115-*d* may forward, or decode-and-forward, the plurality of hashes to one of more of the DSRC devices 115 that are within range.

In either case, the forwarding from DSRC device 115 to DSRC device 115 may efficiently distribute the verified plurality of hashes throughout the DSRC network.

The source, either the cellular base station 130 or the DSRC base station 105, may then randomly select, for example, a packet of the set of coded packets and broadcast the selected packet. Upon receiving the broadcast packet by a DSRC device that has received the verified (or verified the received) plurality of hashes may verify the broadcast packet. For example, by performing a hash on the received and comparing the generated hash to a corresponding hash of the verified plurality of hashes, the broadcast packet may be verified. The source may continue to randomly select and broadcast, and the DSRC device(s) may continue to verify, such that the entire coded set of packets of the CRL may be received, verified and decoded at the DSRC device(s). Thus, the CRL may be securely and efficiently distributed throughout the DSRC network.

Figure 2A:
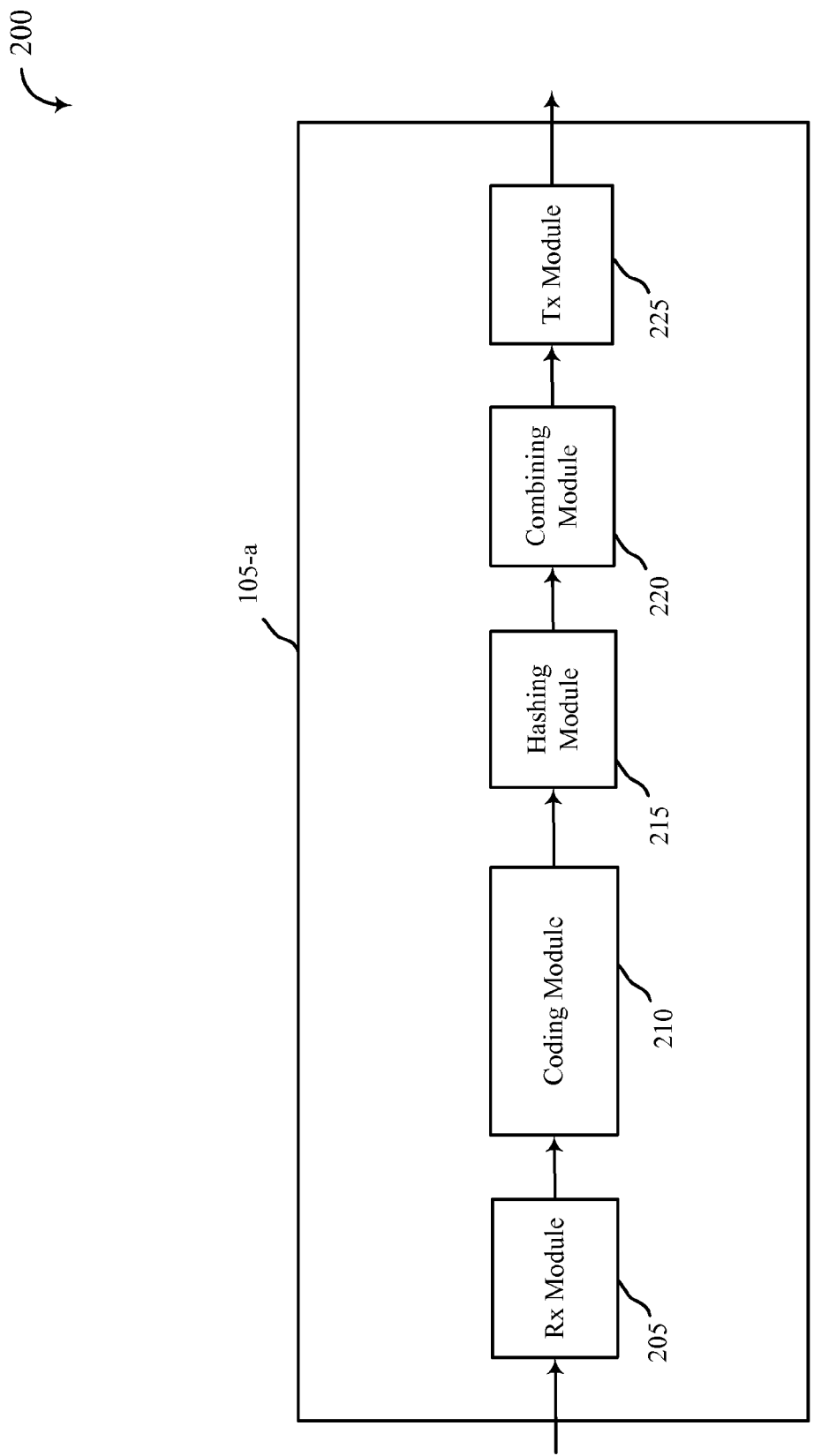
FIG. 2A shows a block diagram of an example of a base station.

FIG. 2A is block diagram 200 illustrating an example of a DSRC base station 105-*a* that may carry out aspects of this disclosure as discussed with respect to FIG. 1. As discussed above, it should be understood that FIG. 2A (and FIGS. 2B and 3) may also be considered to illustrate an example of a cellular base station, depending on the particular implementation. The DSRC base station 105-*a* may include a receiving module 205 configured to receive communications from a cellular base station 130 or a DSRC device 115. In particular, the receiving module 205 may be configured to receive a communication from a certificate authority in the form of a plurality of packets (to obtain a certificate revocation list created by the authority). Thus, the receiving module 205 or receiver may be means for receiving and/or means for obtaining.

The components of the device 105-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The DSRC base station 105-*a* may include a coding module 210 configured to code the plurality of packets using a predefined code to generate a set of coded packets. Additionally, the DSRC base station 105-*a* may include a hashing module 215 configured to hash the packets of the coded set of packets to generate a plurality of hashes. The hashes may then optionally be combined into one or more packets by a combining module 220. The one or more packets may then be transmitted by a transmission module 225 of the DSRC base station 105-*a*. Thus, the coding module 210 or coder may be means for coding, the hashing module 215 or hasher may be means for hashing, and the transmission module 225 or transmitter may be means for transmitting.

Figure 2B:
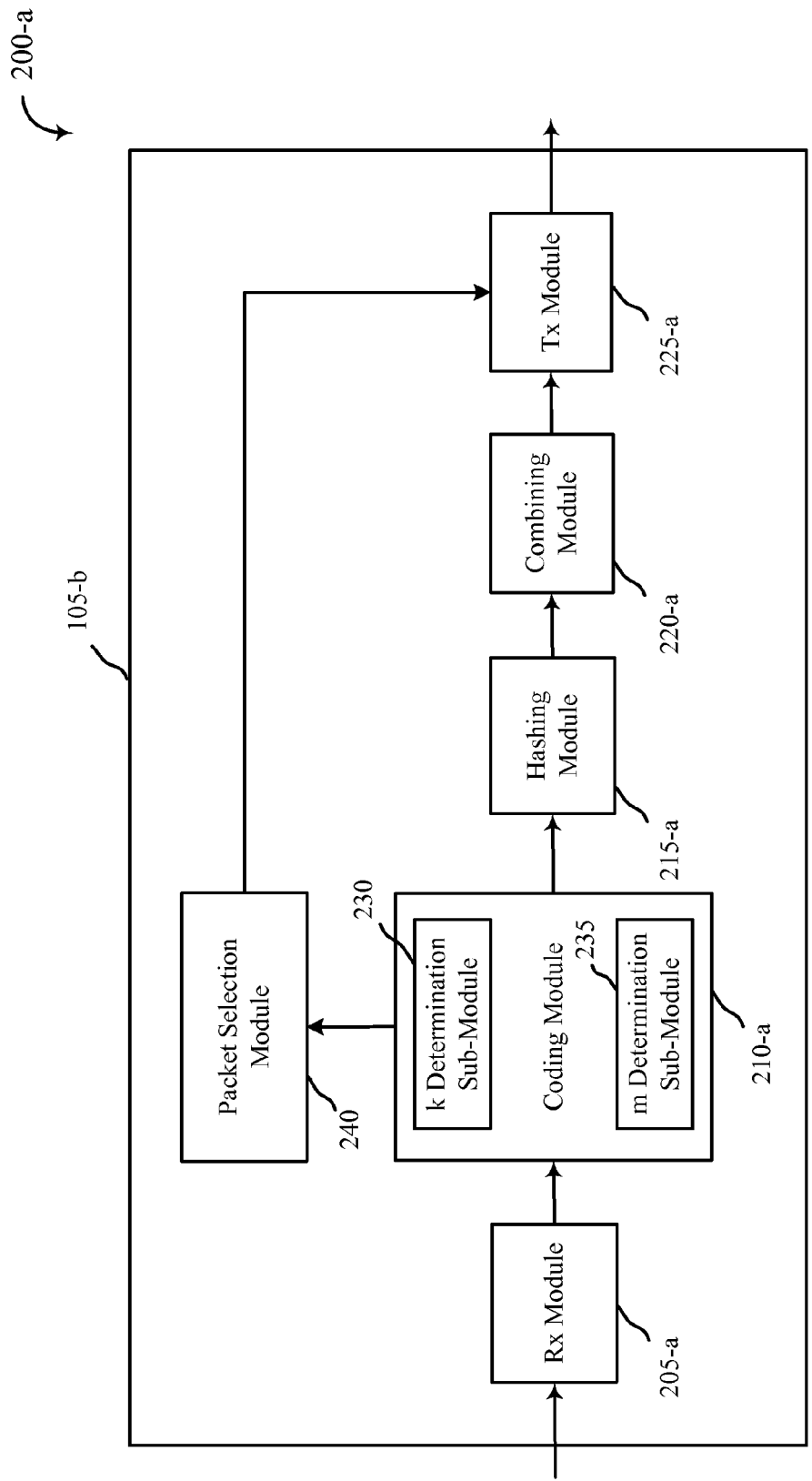
FIG. 2B shows a block diagram of another example of a base station.

FIG. 2B is block diagram 200-*a* illustrating another example of a DSRC base station 105-*b* that may carry out aspects of this disclosure as discussed with respect to FIG. 1. As in the example of FIG. 2A, the DSRC base station 105-*b* may include a receiving module 205-*a*, a hashing module 215-*a*, a combining module 220-*a*, and a transmission module 225-*a*. Each of these modules may include similar functionality as described above.

The components of the device 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The DSRC base station 105-*b* may also include a coding module 210-*a*. In this example, the coding module 210-*a* may include a k determination sub-module 230 and an m determination sub-module 235. The k determination sub-module 230 may be configured to determine a number of packets (k) in the plurality of packets received by the receiving module 205-*a*. The m determination sub-module 235 may be configured to determine a number of packets (m) into which the plurality of packets are to be coded by the coding module 210-*a*. Thus, the k determination sub-module 230 or counter may be means for determining k, and the m determination sub-module 235 may be means for determining m.

In some embodiments, m may be determined to be greater than the determined k. In some embodiments, the number of packets (m) may be determined so that a subset of the coded set of packets with at least k packets is sufficient to recover the k packets in the plurality of packets. Alternatively or additionally, the number of packets (m) may be determined based at least in part on an overhead associated with the transmitting of the plurality of hashes via the network. Thus, the m determination sub-module 235 may include logic that is configured to make such a determination.

The transmitting module 225-a may further be configured to transmit transmitting k, m and the determined code. This may be accomplished, for example, by including k, m and the determined code in a header of one or more packets used to transmit the plurality of hashes.

As shown in FIG. 2B, the DSRC base station 105-b may also include a packet selection module 240. This module may be configured to select one of the packets of the set of coded packets to be broadcast by the transmitting module 225-a. In such case, the number of packets (m) in the coded set of packets may be determined by the m determination sub-module 235 based at least in part on an overhead associated with the broadcasting of the randomly selected packet over the network. The packet selection module 240 may continue to randomly select packets of the set of coded packets so that all of the packets of the coded set of packets are eventually transmitted by the transmission module 225-a at least one, if not multiple times. Thus, the packet selection module 240 or packet selector may be means for selecting.

Figure 3:
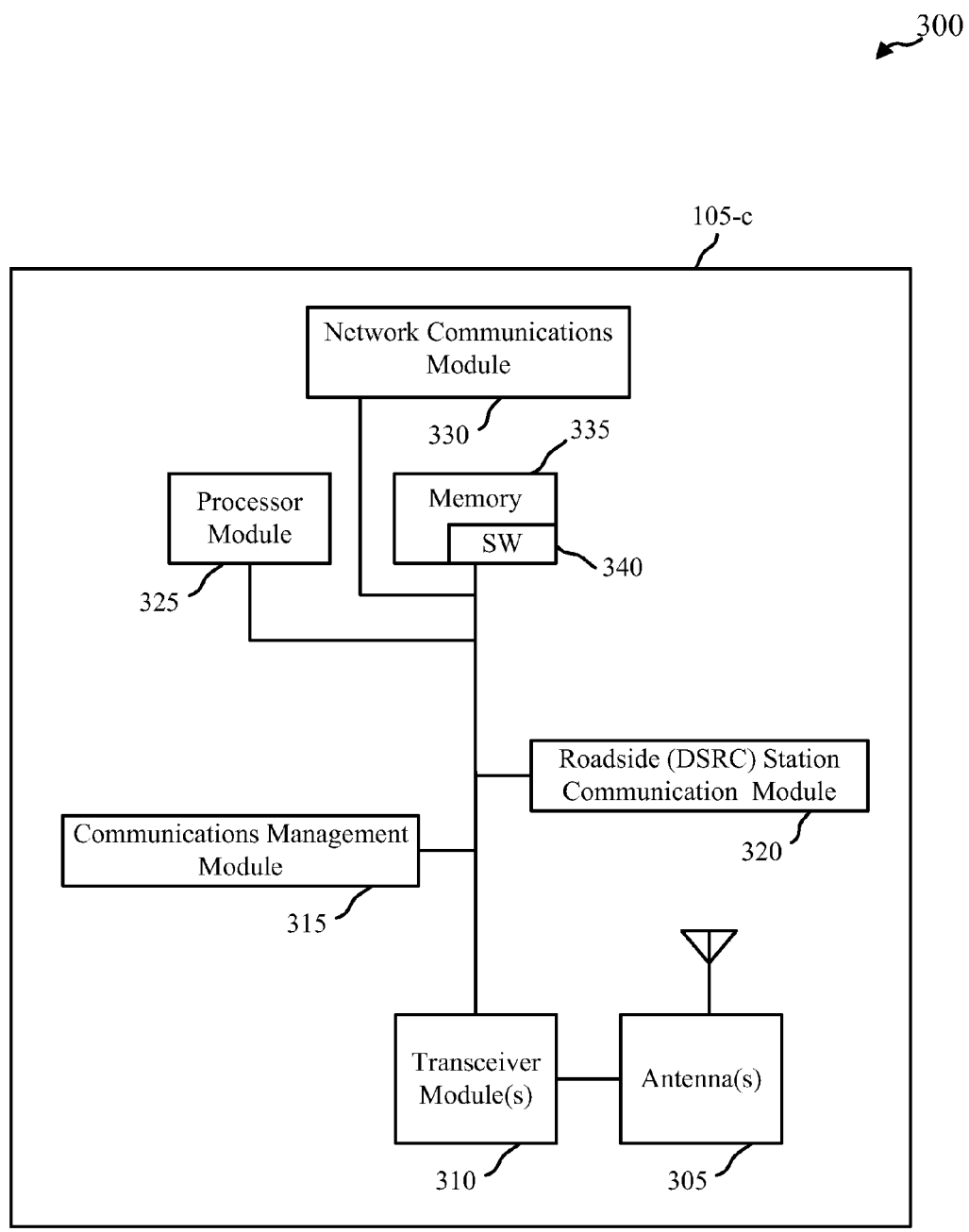
FIG. 3 shows a block diagram of yet another example of a base station.

FIG. 3 is block diagram 300 illustrating yet another example of a DSRC base station 105-c that may be configured for providing secure content delivery. The DSRC base station 105-c may be an example of the DSRC base stations 105 or the cellular base station 130 depicted in FIG. 1. The DSRC base station 105-c may include one or more antennas 305 configured to receive and transmit wireless signals in cooperation with one or more transceiver modules 310. The DSRC base station may further include a communications management module 315, a roadside (DSRC) station communication module 320 (particularly when the DSRC base station 105-c is a cellular base station 130) a processor module 325, a network communications module 330, and a memory 335, each of which may be in communication, directly or indirectly, with each other (e.g., over one or more buses).

The transceiver module 310 may be configured to communicate, via the antenna(s) 305, with (other) DSRC base stations under control by the roadside (DSRC) station communication module 320. Also, the transceiver module 310 may be configured to communicate, via the antenna(s) 305, with DSRC devices under control by the communications management module 315. Further, the transceiver module 310 may be configured to communicate, via the antenna(s) 305, with another network (e.g., cellular) under control by the network communications module 330, for example, to receive the CRL from a generating authority. Thus, the transceiver module 310 or transceiver may be means for transmitting, broadcasting and/or obtaining, alone or in combination with the modules 315, 320 and/or 330, and/or the antenna(s).

The memory 335 may include random access memory (RAM) and read-only memory (ROM). The memory 335 may also store computer-readable, computer-executable software code 340 containing instructions that are configured to, when executed, cause the processor module 325 to perform various functions described herein (e.g., coding, hashing, etc.). Alternatively, the software code 340 may not be directly executable by the processor module 325, but may be configured to cause a computer, e.g., when compiled and executed, to perform functions described herein. Thus, the processor module 325 or processor may be means for coding, hashing, combining, signing and/or encrypting, alone or in combination with the memory 335 and the software code 340.

The processor module 325 may include an intelligent hardware device, e.g., a central processing unit (CPU), a microcontroller, an application-specific integrated circuit (ASIC), etc. The transceiver module 310 may include a modem configured to modulate the packets and provide the modulated packets to the antenna(s) 305 for transmission, and to demodulate packets received from the antenna(s) 305.

Although the communications management module 315 is shown separately, the functionality of the communications management module 315 may be implemented as a component of the transceiver module 310, as a computer program product, and/or as one or more controller elements of the processor module 325. Similarly, the roadside (DSRC) station communication module 320 and the network communications module 330 may be implemented as components of the transceiver module 310, as a computer program products, and/or as one or more controller elements of the processor module 325.

Figure 4A:
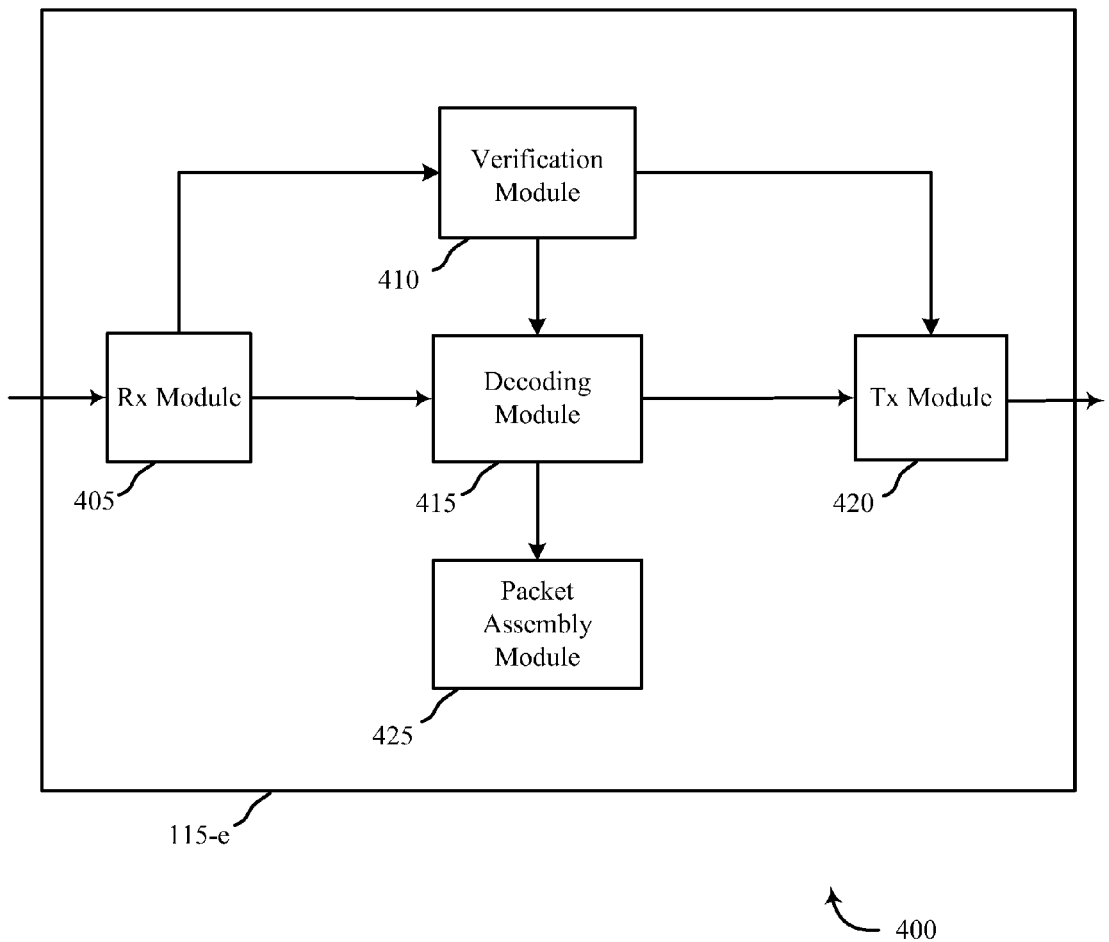
FIG. 4A shows a block diagram of an example of a user equipment (UE)

FIG. 4A is block diagram 400 illustrating an example of a DSRC device 115-e that may carry out aspects of this disclosure as discussed with respect to FIG. 1. The DSRC device 115-e may include a receiving module 405 configured to receive communications from a cellular base station 130, a DSRC base station 105, and/or another DSRC device 115. Thus, the receiving module 405 or receiver may be means for receiving.

The components of the DSRC device 115-e may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The DSRC device 115-e may also include a verification module 410 configured to verify a plurality of hashes received from the source. As discussed above, the verification may involve a signed certificate or electronic signature received with the plurality of hashes, or encryption of the plurality of hashes, or both. The verification module 410 may verify the plurality of hashes by performing two functions: (1) checking the certificate or signature; and (2) hashing a random packet and comparing the obtained hash with the corresponding hash in the plurality of hashes (e.g., verify by a match). The verification module 410 may be configured to communicate that the plurality of hashes have been verified to a decoding module 415 configured to decode the set of coded packets using the predefined code. The DSRC device 115-e may include a transmission module 225 configured to transmit the decoded set of packets to another DSRC device 115 (e.g., decode-and-forward). Alternatively or additionally, the transmission module 225 may be configured to transmit the verified plurality of hashes (possibly with the electronic signature and/or encryption) to another DSRC device 115 (e.g., forward). Thus, the verification module 410, certificate/signature checker or encryption checker, may be means for verifying, and the decoding module 415 or decoder may be means for decoding. Similarly, the transmission module 225 or transmitter may be means for transmitting.

The receiving module 405 also may be configured to receive randomly selected packets of the set of coded packets from the source. The verification module 410 also may be configured to verify these packets. Once verified, these packets may be decoded by the decoding module 415. The DSRC device 115-e may further include a packet assembly module 425 configured to assemble the randomly received decoded packets to obtain the original plurality of packets (e.g., the certificate revocation list (CRL)). Thus, the packet assembly module 425 or packet assembler may be means for assembling.

Figure 4B:
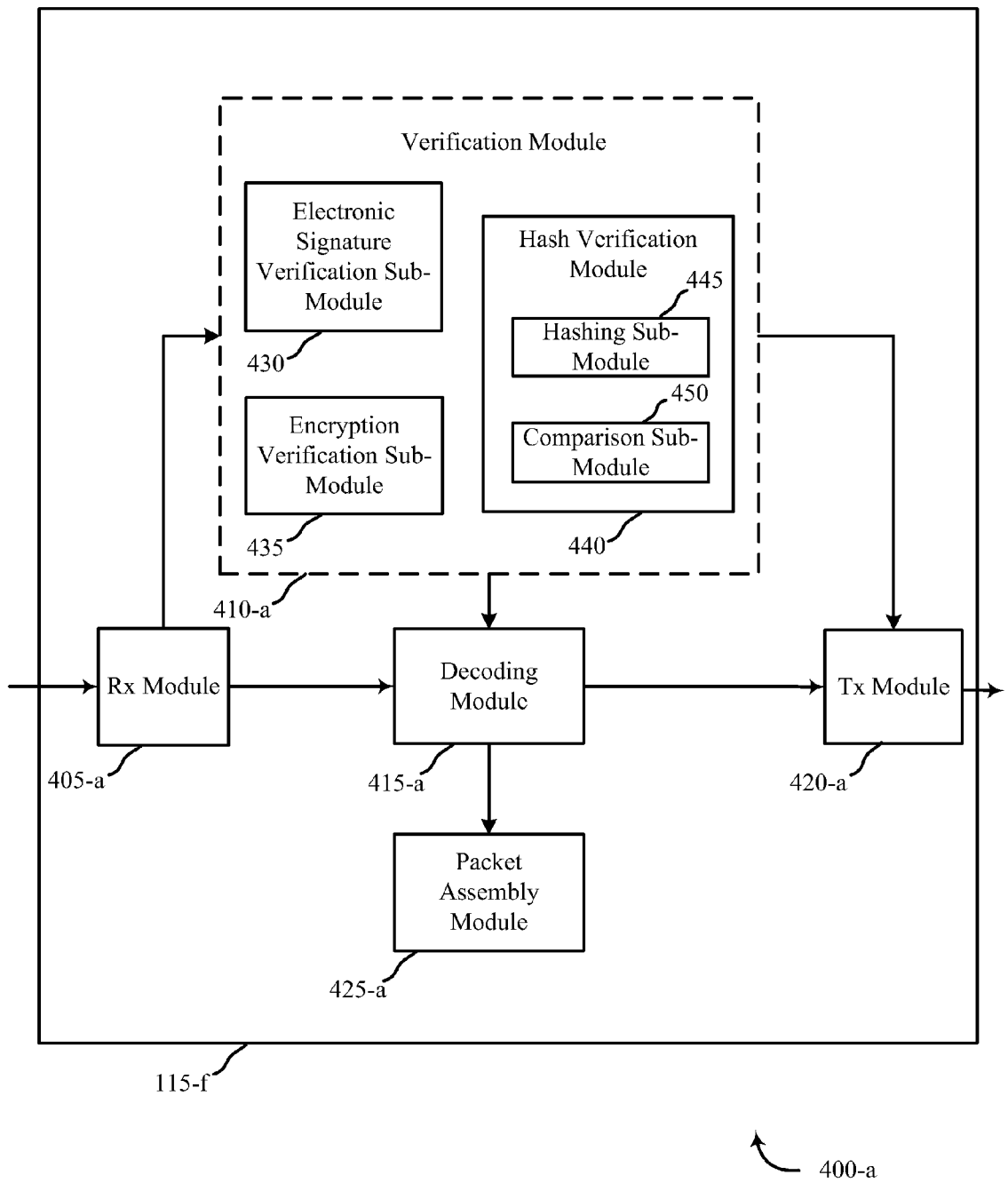
FIG. 4B shows a block diagram of another example of a UE.

FIG. 4B is block diagram 400-a illustrating another example of a DSRC device 115-f that may carry out aspects of this disclosure as discussed with respect to FIG. 1. As in the example of FIG. 4A, the DSRC device 115-f may include a receiving module 405-a, a decoding module 415-a, a packet assembly module 425-a, and a transmission module 420-a. Each of these modules may include similar functionality as described above.

The components of the device 115-f may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The DSRC device 115-f may also include a verification module 410-a. In this example, the verification module 410-a may include an electronic signature verification sub-module 430, an encryption verification sub-module 435, and a hash verification module 440. These sub-modules may be configured to carry out the functions described above with respect to FIG. 4A for verifying the plurality of hashes based on an electronic signature, an encryption and a hash of a random packet, respectively. Thus, the electronic signature verification sub-module 430 or signature verifier, the encryption verification sub-module 435 or encryption verifier, and the hash verification sub-module 440 or hash verifier may be means for verifying the electronic signature, the encryption and the hashes, respectively.

The hash verification module 440 may be configured to carry out the functions described above with respect to FIG. 4A for verifying the randomly selected packets of the set of coded packets received from the source. More particularly, the hash verification module 440 may include a hashing sub-module 445 and a comparison sub-module 450. The hashing sub-module 445 may be configured to hash the randomly selected packets of the set of coded packets received from the source to generate a hash for each packet. The comparison sub-module 450 may be configured to compare the generated hash with a corresponding hash of the plurality of hashes previously received. For example, a match between the two hashes for a given packet may verify that packet. Thus, the hashing sub-module or hasher and the comparison sub-module 450 or comparator may be means for hashing and comparing, respectively. As above, once the packets are verified, the packets may be decoded by the decoding module 415-a, and may be assembled by the packet assembly module 425-a to obtain the original plurality of packets (e.g., the certificate revocation list (CRL)).

Figure 5:
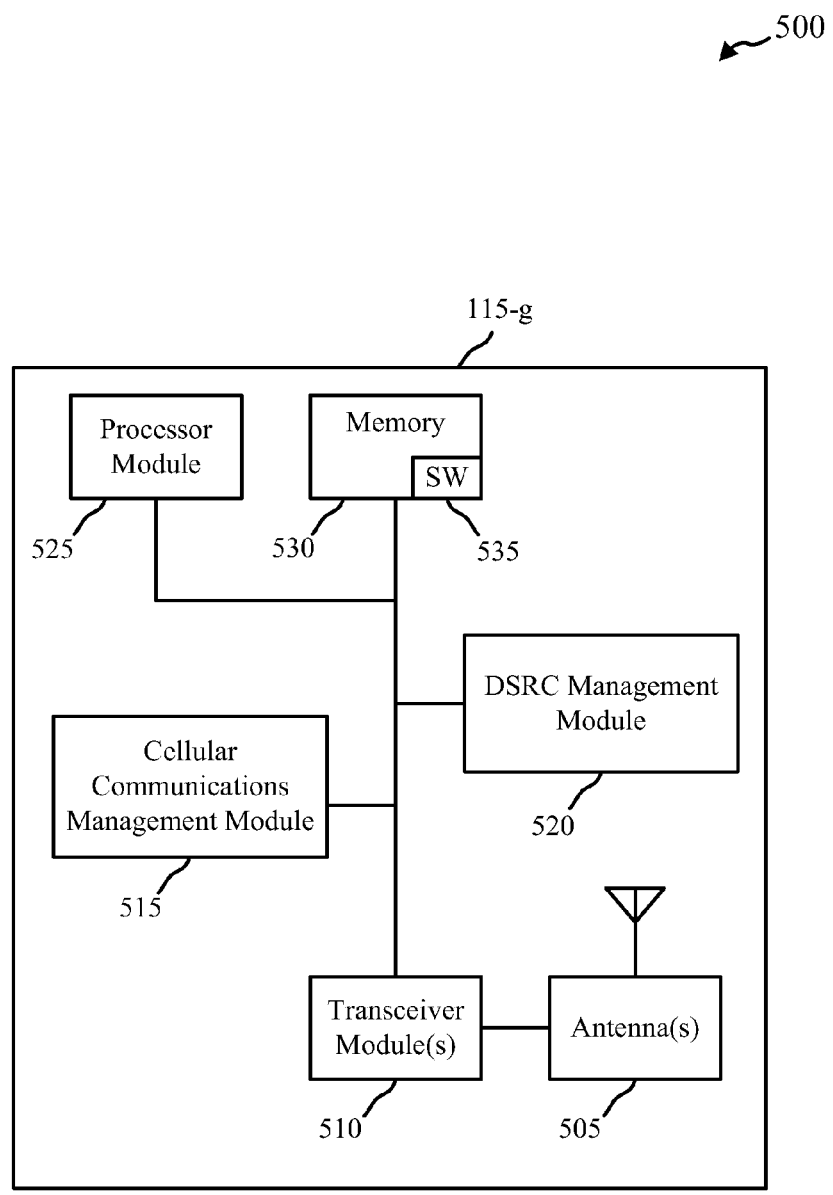
FIG. 5 shows a block diagram of yet another example of a UE.

FIG. 5 is block diagram 500 illustrating yet another example of a DSRC device 115-g that may be configured for providing secure content delivery. The DSRC device 115-g may be an example of the DSRC devices 115 depicted in FIG. 1. The DSRC device 115-g may include one or more antennas 505 configured to receive and transmit wireless signals in cooperation with one or more transceiver modules 510. The DSRC device may further include a cellular communications management module 515, a DSRC communications management module 520, a processor module 525, and a memory 530, each of which may be in communication, directly or indirectly, with each other (e.g., over one or more buses).

The transceiver module 510 may be configured to communicate, via the antenna(s) 505, with other DSRC devices 115 and DSRC base stations 105 under control by the DSRC communications management module 520. Also, the transceiver module 510 may be configured to communicate, via the antenna(s) 505, with other a cellular base station 130 under control by the cellular communications management module 515. Thus, the transceiver module 510 or transceiver may be means for transmitting, broadcasting and/or obtaining, alone or in combination with the modules 515 and/or 520, and/or the antenna(s).

The memory 530 may include random access memory (RAM) and read-only memory (ROM). The memory 530 may also store computer-readable, computer-executable software code 535 containing instructions that are configured to, when executed, cause the processor module 525 to perform various functions described herein (e.g., verification, decoding, etc.). Alternatively, the software code 535 may not be directly executable by the processor module 525, but may be configured to cause a computer, e.g., when compiled and executed, to perform functions described herein. Thus, the processor module 525 or processor may be means for coding, hashing, combining, signing and/or encrypting, alone or in combination with the memory 530 and the software code 535.

The processor module 525 may include an intelligent hardware device, e.g., a central processing unit (CPU), a microcontroller, an application-specific integrated circuit (ASIC), etc. The transceiver module 510 may include a modem configured to modulate the packets and provide the modulated packets to the antenna(s) 505 for transmission, and to demodulate packets received from the antenna(s) 505.

Although the cellular communications management module 515 is shown separately, the functionality of the cellular communications management module 515 may be implemented as a component of the transceiver module 510, as a computer program product, and/or as one or more controller elements of the processor module 525. Similarly, the DSRC communications management module 520 may be implemented as components of the transceiver module 510, as a computer program products, and/or as one or more controller elements of the processor module 525.

Figure 6:
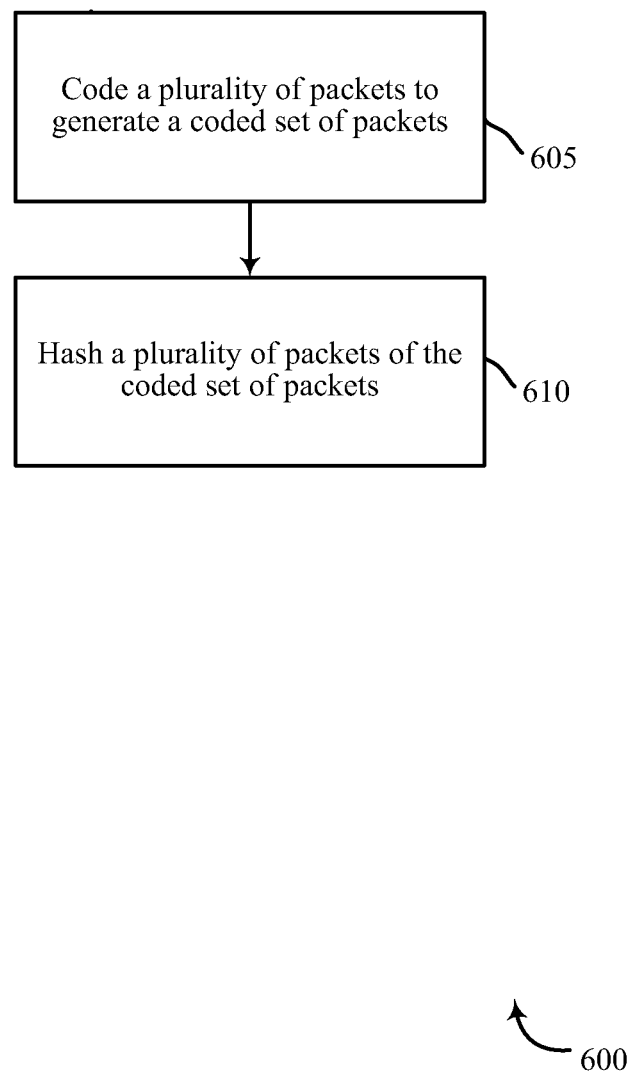
FIG. 6 is a flowchart of a method of securing content for delivery implemented at a source.

FIG. 6 is a flowchart illustrating one embodiment of a method 600 for securing content for delivery via a communications network. For clarity, the method 600 is described below with reference to aspects of one or more of the DSRC base stations 105 described with reference to FIGS. 1,2A, 2B and/or 3. In one implementation, the processor module 325 described with reference to FIG. 3 may execute one or more sets of codes to control the functional elements of a DSRC base station 105 to perform the functions described below.

At block 605, a DSRC base station 105 may be operated to code a plurality of packets to generate a coded set of packets. This may be done using a determined code. The code may be determined as described above. In particular, coding may involve determining a number of packets (k) in the plurality of packets, and coding the k packets using the determined code to generate a number of packets (m) in the coded set of packets. In some embodiments, m may be greater than k. The number of packets (m) in the coded set of packets may be determined so that a subset of the coded set of packets with at least k packets is sufficient to recover the k packets in the plurality of packets. Further, the number of packets (m) in the coded set of packets may be determined based at least in part on an overhead associated with the transmitting of the plurality of hashes via the wireless communications network.

At block 610, the DSRC base station 105 may be operated to hash a plurality of packets of the coded set of packets. The hash may be performed using any suitable hashing algorithm as desired. In this manner, the content of the plurality of packets may be secured for delivery. Although not shown, the plurality of hashes may be transmitted via a communications network. Thus, coding and hashing at the source may be performed to provide secure content for delivery in an efficient manner.

Figure 7:
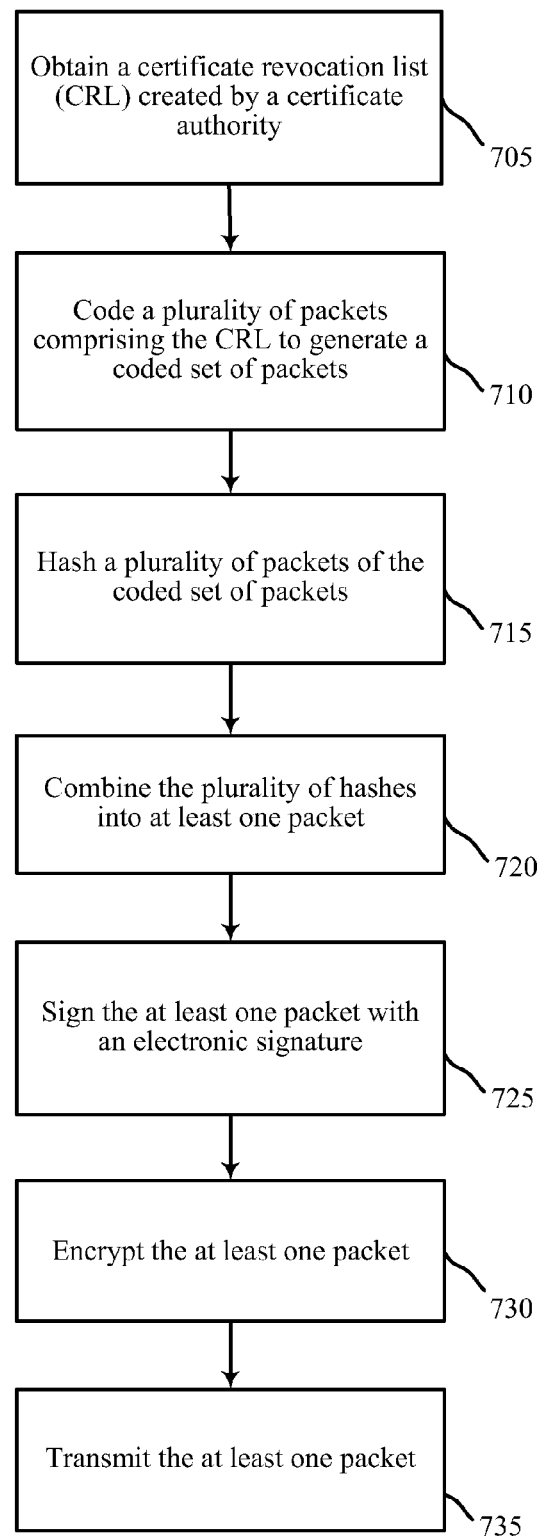
FIG. 7 is a flowchart of another method of securing content for delivery implemented at a source.

FIG. 7 is a flowchart illustrating another embodiment of a method 700 for securing content for delivery via a communications network. For clarity, the method 700 is described below with reference to aspects of one or more of the DSRC base stations 105 described with reference to FIGS. 1,2A, 2B and/or 3. In one implementation, the processor module 325 described with reference to FIG. 3 may execute one or more sets of codes to control the functional elements of a DSRC base station 105 to perform the functions described below.

At block 705, a DSRC base station 105 may be operated to obtain a CRL from a certificate authority. This may be accomplished, for example, by the DSRC base station 105 receiving a transmission from a certificate authority via any suitable means.

At block 710, the DSRC base station 105 may code a plurality of packets, comprising the CRL, to generate a coded set of packets. As above, this may be done using a determined code.

At block 715, the DSRC base station 105 may be operated to hash a plurality of packets of the coded set of packets. Again, the hash may be performed using any suitable hashing algorithm as desired. In this manner, the content (the CRL) may be secured for delivery.

At block 720, the DSRC base station 105 may be operated to combine the plurality of hashes into at least one packet. Then, at block 725, the DSRC base station 105 may be operated to sign the at least one packet with an electronic signature. Alternatively or additionally, at block 730, the DSRC base station 105 may be operated to encrypt the at least one packet. Finally, at block 735, the at least one signed and/or encrypted packet may be transmitted. According to this embodiment, coding and hashing at the source may be performed to secure the content for delivery in an efficient manner. Further, signing with an electronic signature or encrypting may provide an efficient mechanism for a recipient of the transmission to verify the at least one packet.

Figure 8:
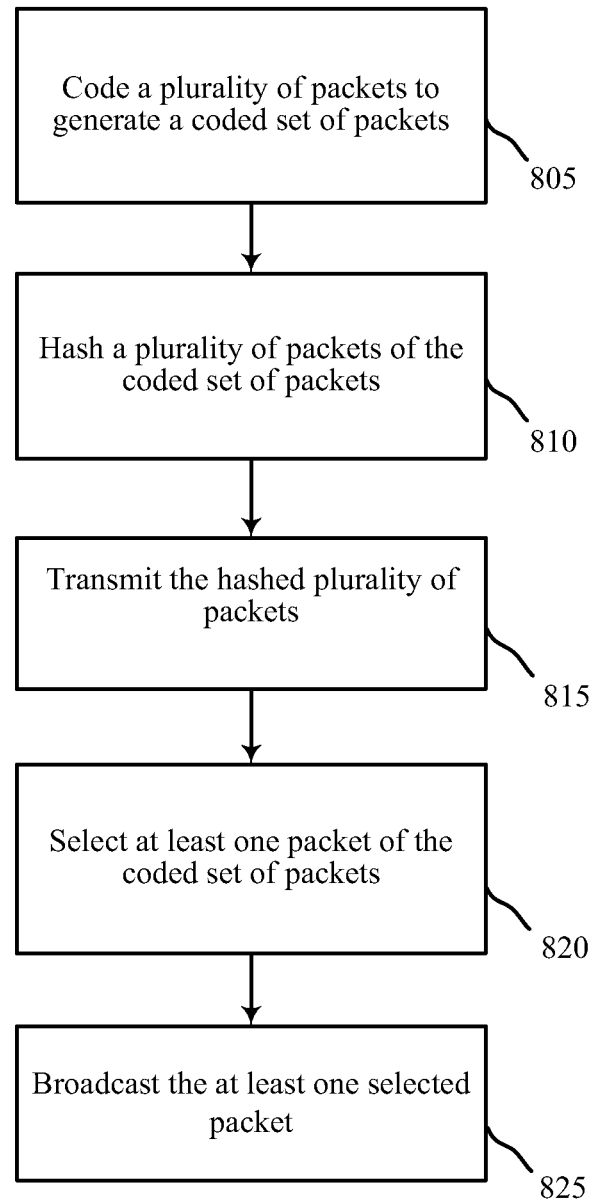
FIG. 8 is a flowchart of a method of secure content delivery implemented at a source.

FIG. 8 is a flowchart illustrating an embodiment of a method 800 for secure content delivery via a communications network. For clarity, the method 800 is described below with reference to aspects of one or more of the DSRC base stations 105 described with reference to FIGS. 1,2A, 2B and/or 3. In one implementation, the processor module 325 described with reference to FIG. 3 may execute one or more sets of codes to control the functional elements of a DSRC base station 105 to perform the functions described below.

At block 805, a DSRC base station 105 may be operated to code a plurality of packets to generate a coded set of packets. As above, this may be done using a determined code.

At block 810, the DSRC base station 105 may be operated to hash a plurality of packets of the coded set of packets. Again, the hash may be performed using any suitable hashing algorithm as desired. In this manner, the content (the CRL) may be secured for delivery.

At block 815, the DSRC base station 105 may be operated to transmit the hashed plurality of packets. Then, at block 820, the DSRC base station 105 may be operated to select at least one packet of the coded set of packets. This may be done randomly. Finally, at block 825, the DSRC base station 105 may be operated to broadcast the at least one selected packet. According to this embodiment, coding and hashing at the source may be performed to secure the content for delivery in an efficient manner. Further, selecting and broadcasting packets of the coded set of packets may provide an efficient mechanism delivering the secured content of the original plurality of packets throughout the network.

Figure 9:
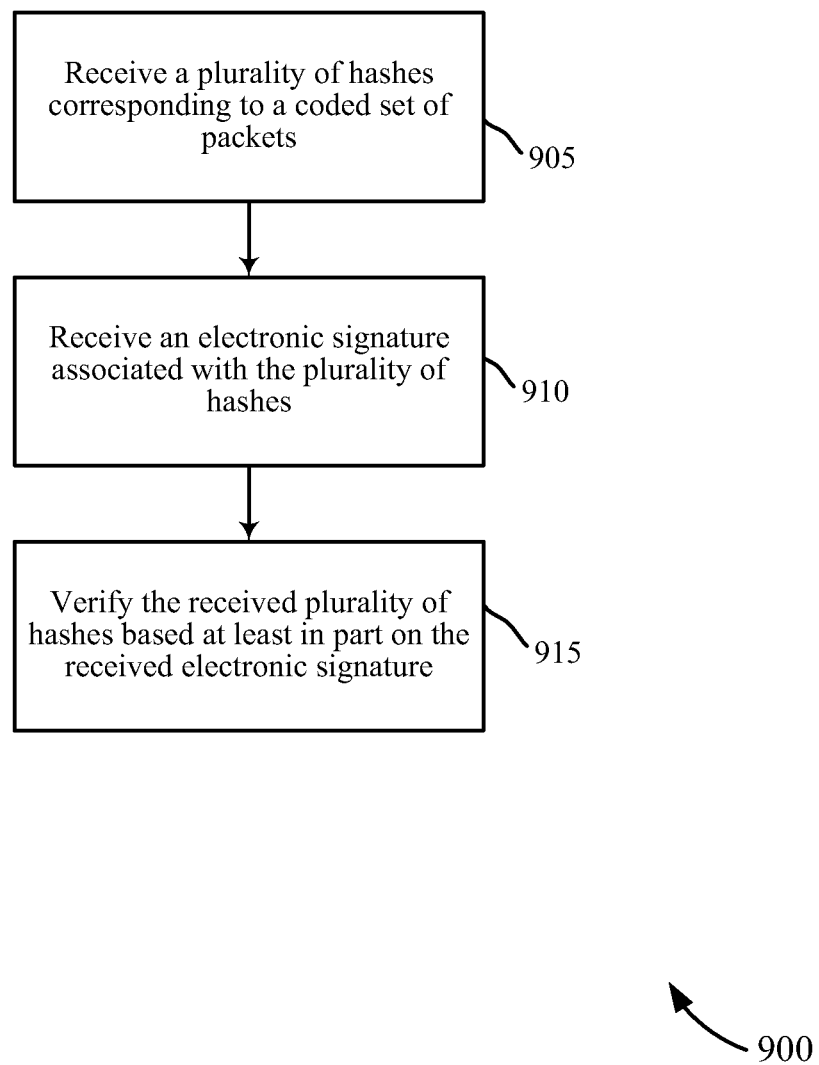
FIG. 9 is a flowchart of a method of secure content delivery implemented at a UE.

FIG. 9 is a flowchart illustrating one embodiment of a method 900 for secure content delivery in a wireless communications network. For clarity, the method 900 is described below with reference to aspects of one or more of the DSRC devices 115 described with reference to FIGS. 1, 4A, 4B and/or 5. In one implementation, the processor module 525 described with reference to FIG. 5 may execute one or more sets of codes to control the functional elements of a DSRC device 115 to perform the functions described below.

At block 905, a DSRC device 115 may be operated to receive a plurality of hashes corresponding to a coded set of packets. For example, this may be performed by receiving the transmission in block 615 of FIG. 6 or in block 735 in FIG. 7.

At block 910, the DSRC device 115 may be operated to receive an electronic signature associated with the plurality of hashes. For example, this may be performed by receiving the transmission in block 735 in FIG. 7.

Then, at block 915, the DSRC device 115 may be operated to verify the received plurality of hashes based at least in part on the received electronic signature. According to this embodiment, receiving data that has been coded and hashed at the source may be performed to have secure content delivered in an efficient manner. Further, the data may be verified efficiently based on the electronic signature.

Figure 10:
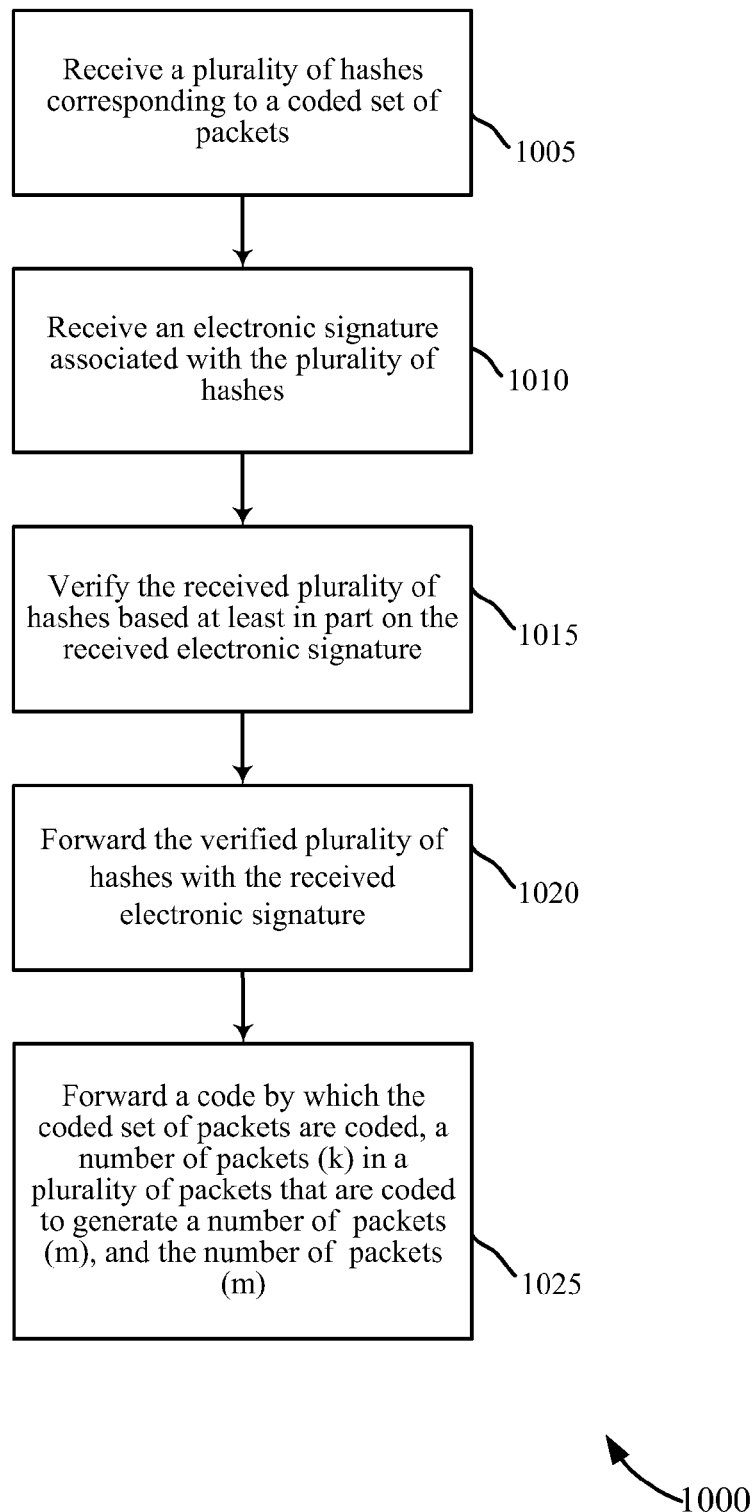
FIG. 10 is a flowchart of another method of secure content delivery implemented at a UE.

FIG. 10 is a flowchart illustrating another embodiment of a method 1000 for secure content delivery via a communications network. For clarity, the method 1000 is described below with reference to aspects of one or more of the DSRC devices 115 described with reference to FIGS. 1, 4A, 4B and/or 5. In one implementation, the processor module 525 described with reference to FIG. 5 may execute one or more sets of codes to control the functional elements of a DSRC device 115 to perform the functions described below.

At block 1005, a DSRC device 115 may be operated to receive a plurality of hashes corresponding to a coded set of packets. For example, this may be performed by receiving the transmission in block 615 of FIG. 6 or in block 735 in FIG. 7.

At block 1010, the DSRC device 115 may be operated to receive an electronic signature associated with the plurality of hashes. For example, this may be performed by receiving the transmission in block 735 in FIG. 7.

Then, at block 1015, the DSRC device 115 may be operated to verify the received plurality of hashes based at least in part on the received electronic signature.

At block 1020, the DSRC device 115 may be operated to forward the verified plurality of hashes with the electronic signature to one or more other DSRC devices 115. Further, at block 1025, the DSRC device 115 may be operated to forward a code by which the coded set of packets are coded, a number of packets (k) in a plurality of packets that are coded to generate a number of packets (m), and the number of packets (m). As discussed above, this may be accomplished by including the code, k and m in a header, for example, of the forwarded hashes. According to this embodiment, receiving data that has been coded and hashed at the source may be performed to have secure content delivered in an efficient manner. Also, the data may be verified efficiently based on the electronic signature. Further, verified data may be forwarded to other DSRC devices 115 to provide secure content delivery throughout the network.

Figure 11:
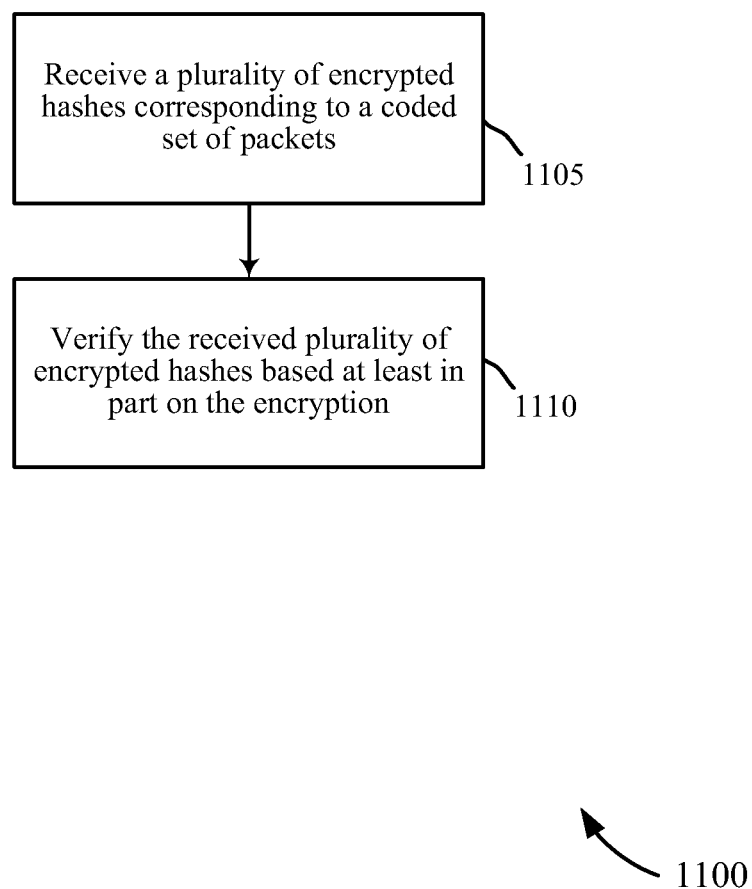
FIG. 11 is a flowchart of yet another method of secure content delivery implemented at a UE.

FIG. 11 is a flowchart illustrating another embodiment of a method 1100 for secure content delivery via a communications network. For clarity, the method 1100 is described below with reference to aspects of one or more of the DSRC devices 115 described with reference to FIGS. 1, 4A, 4B and/or 5. In one implementation, the processor module 525 described with reference to FIG. 5 may execute one or more sets of codes to control the functional elements of a DSRC device 115 to perform the functions described below.

At block 1105, a DSRC device 115 may be operated to receive a plurality of encrypted hashes corresponding to a coded set of packets. For example, this may be performed by receiving the transmission in block 735 in FIG. 7.

Then, at block 1110, the DSRC device 115 may be operated to verify the received plurality of hashes based at least in part on the encryption. According to this embodiment, receiving data that has been coded and hashed at the source may be performed to have secure content delivered in an efficient manner. Further, the data may be verified efficiently based on the encryption.

Figure 12:
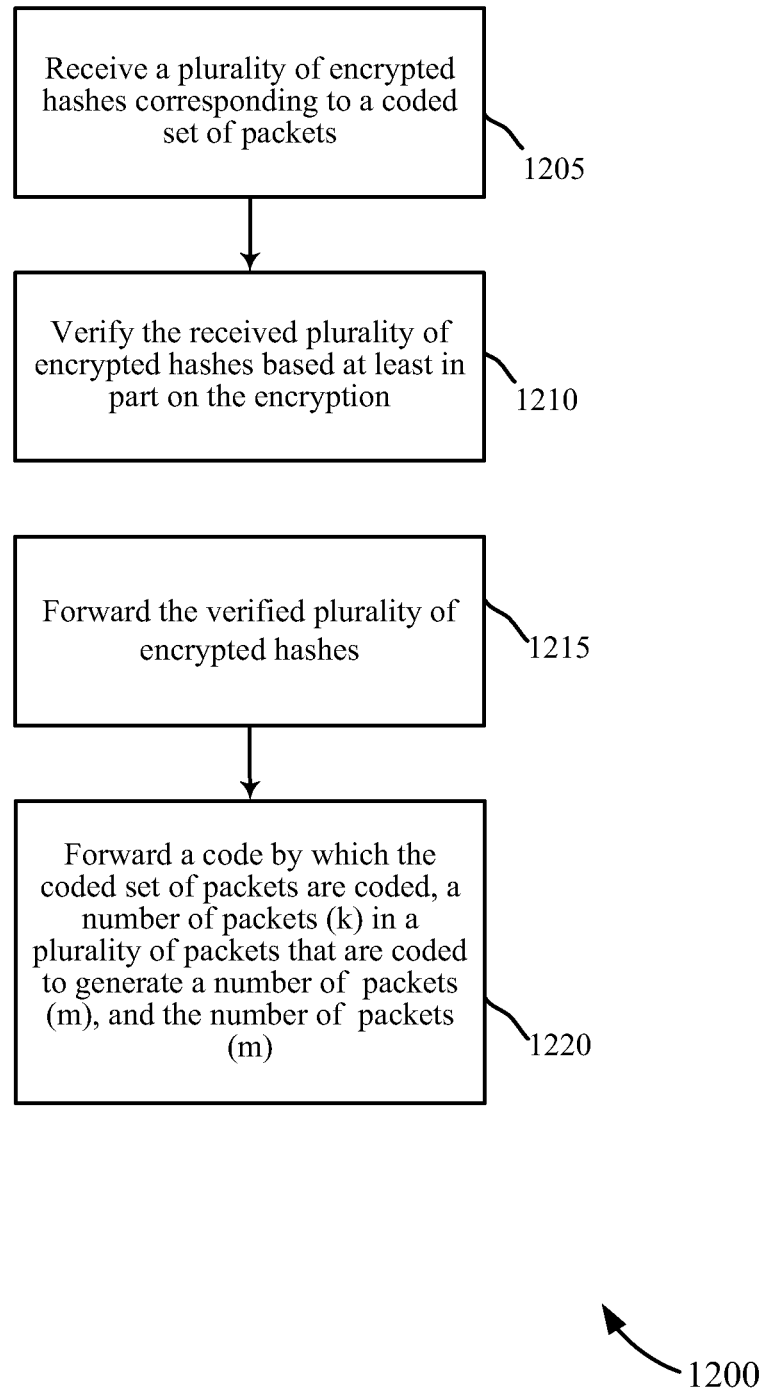
FIG. 12 is a flowchart of still another method of secure content delivery implemented at a UE.

FIG. 12 is a flowchart illustrating another embodiment of a method 1200 for secure content delivery via a communications network. For clarity, the method 1200 is described below with reference to aspects of one or more of the DSRC devices 115 described with reference to FIGS. 1, 4A, 4B and/or 5. In one implementation, the processor module 525 described with reference to FIG. 5 may execute one or more sets of codes to control the functional elements of a DSRC device 115 to perform the functions described below.

At block 1205, a DSRC device 115 may be operated to receive a plurality of encrypted hashes corresponding to a coded set of packets. For example, this may be performed by receiving the transmission in block 735 in FIG. 7.

Next, at block 1210, the DSRC device 115 may be operated to verify the received plurality of hashes based at least in part on the encryption. At block 1215, the DSRC device 115 may be operated to forward the verified plurality of encrypted hashes to one or more other DSRC devices 115. Further, at block 1220, the DSRC device 115 may be operated to forward a code by which the coded set of packets are coded, a number of packets (k) in a plurality of packets that are coded to generate a number of packets (m), and the number of packets (m). As discussed above, this may be accomplished by including the code, k and m in a header, for example, of the forwarded hashes. According to this embodiment, receiving data that has been coded and hashed at the source may be performed to have secure content delivered in an efficient manner. Also, the data may be verified efficiently based on the encryption. Further, verified data may be forwarded to other DSRC devices 115 to provide secure content delivery throughout the network.

Figure 13:
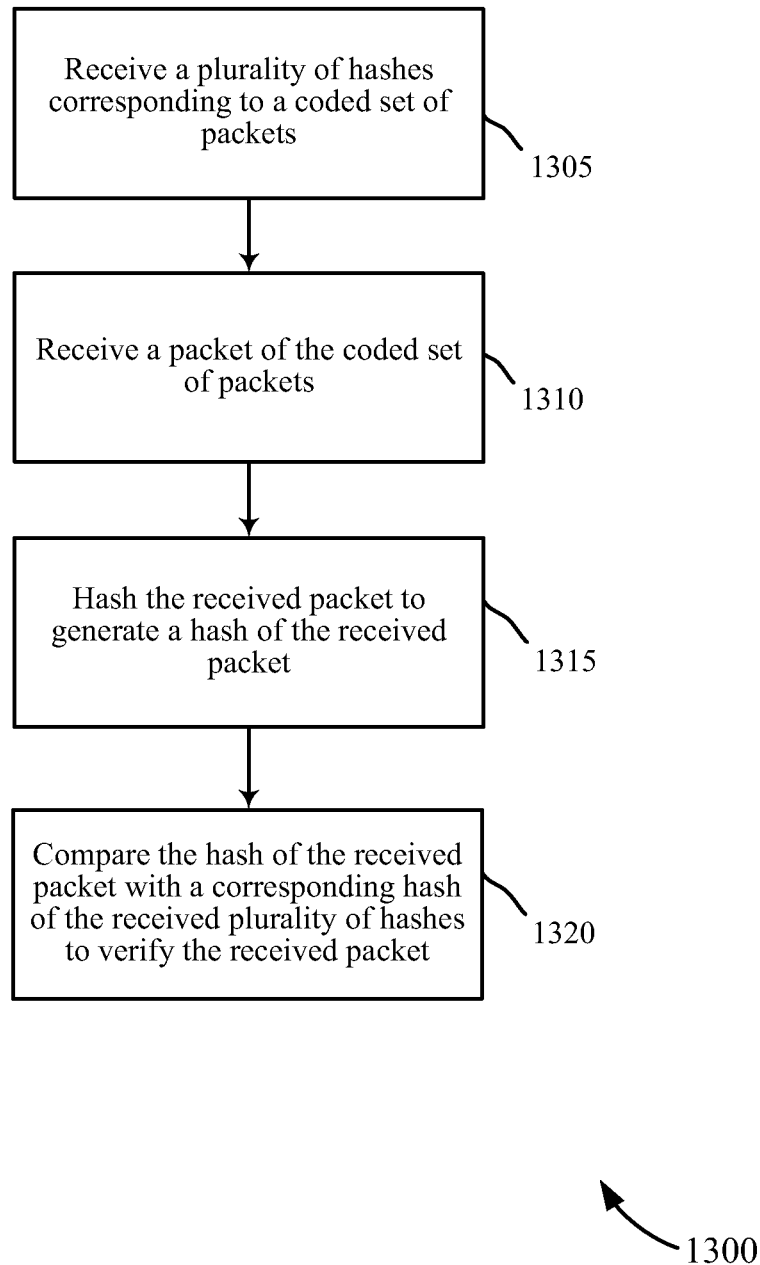
FIG. 13 is a flowchart of a final example of a method of secure content delivery implemented at a UE.

FIG. 13 is a flowchart illustrating another embodiment of a method 1300 for secure content delivery via a communications network. For clarity, the method 1300 is described below with reference to aspects of one or more of the DSRC devices 115 described with reference to FIGS. 1, 4A, 4B and/or 5. In one implementation, the processor module 525 described with reference to FIG. 5 may execute one or more sets of codes to control the functional elements of a DSRC device 115 to perform the functions described below.

At block 1305, a DSRC device 115 may be operated to receive a plurality of hashes corresponding to a coded set of packets. For example, this may be performed by receiving the transmission in block 615 of FIG. 6 or in block 735 in FIG. 7.

At block 1310, the DSRC device 115 may be operated to receive a packet of the coded set of packets. For example, this may be performed by receiving the broadcast in block 825 in FIG. 8.

Then, at block 1315, the DSRC device 115 may be operated to hash the received packet to generate a hash of the received packet.

At block 1320, the DSRC device 115 may be operated to compare the hash of the received packet with a corresponding hash of the received plurality of hashes to verify the received packet. According to this embodiment, receiving data that has been coded and hashed at the source may be performed to have secure content delivered in an efficient manner. Also, a received packet may be verified efficiently based on a corresponding hash of the received plurality of hashes, by simply performing a hash on the received packet.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of secure content distribution for wireless communications, comprising:
   identifying a plurality of packets comprising content to be delivered;
   coding the plurality of packets using a determined code to generate a coded set of packets;
   hashing a plurality of packets of the coded set of packets to generate a plurality of hashes;
   transmitting the plurality of hashes via a communications network; and
   transmitting each packet of the coded set of packets after transmitting the plurality of hashes, wherein transmitting each packet of the coded set of packets comprises:
      selecting at least one packet of the coded set of packets;
      broadcasting the at least one selected packet over a wireless communications network independently of the transmitting the plurality of hashes; and
   repeating the selecting and the broadcasting until each packet of the coded set of packets has been broadcasted.

2. The method of claim 1, wherein transmitting the plurality of hashes comprises:
   combining the plurality of hashes into at least one packet of hashes;
   at least one of:
      signing the at least one packet of hashes with an electronic signature, or
      encrypting the at least one packet of hashes; and
   transmitting the at least one packet of hashes via the communications network.

3. The method of claim 1, wherein selecting the at least one packet of the coded set of packets comprises:
   randomly selecting at least one packet of the coded set of packets.

4. The method of claim 1, wherein coding the plurality of packets using a determined code to generate a coded set of packets comprises:
   determining a number of packets (k) in the plurality of packets; and
   coding the k packets using the determined code to generate a number of packets (m) in the coded set of packets, m being greater than k.

5. The method of claim 4, further comprising:
   determining the number of packets (m) in the coded set of packets so that a subset of the coded set of packets with at least k packets is sufficient to recover the k packets in the plurality of packets.

6. The method of claim 4, further comprising:
   transmitting k, m and the determined code via the communications network.

7. The method of claim 4, further comprising:
   determining the number of packets (m) in the coded set of packets based at least in part on an overhead associated with transmitting the plurality of hashes via the communications network.

8. The method of claim 4, further comprising:
   randomly selecting at least one packet of the coded set of packets; and
   determining the number of packets (m) in the coded set of packets based at least in part on an overhead associated with the broadcasting of the at least one randomly selected packet over the wireless communications network.

9. The method of claim 1, wherein transmitting the plurality of hashes via the communications network comprises:
   wirelessly transmitting the plurality of hashes.

10. The method of claim 1, wherein transmitting the plurality of hashes via the communications network comprises:
    transmitting via a wired backhaul.

11. An apparatus for secure content distribution for wireless communications, comprising:
    means for identifying a plurality of packets comprising content to be delivered;
    means for coding the plurality of packets using a determined code to generate a coded set of packets; and
    means for hashing a plurality of packets of the coded set of packets to generate a plurality of hashes;
    means for transmitting the plurality of hashes via a communications network; and
    means for transmitting each packet of the coded set of packets after transmitting the plurality of hashes, wherein the means for transmitting each packet of the coded set of packets comprises:
       means for selecting at least one packet of the coded set of packets;
       means for broadcasting the at least one selected packet over a wireless communications network independently of the transmitting the plurality of hashes; and
    means for repeating the selecting and the broadcasting until each packet of the coded set of packets has been broadcasted.

12. The apparatus of claim 11, wherein the means for transmitting the plurality of hashes comprises:
    means for combining the plurality of hashes into at least one packet of hashes;
    at least one of:
       means for signing the at least one packet of hashes with an electronic signature, or
       means for encrypting the at least one packet of hashes; and
    means for transmitting the at least one packet of hashes via the communications network.

13. The apparatus of claim 11, wherein the means for selecting the at least one packet of the coded set of packets comprises:
    means for randomly selecting at least one packet of the coded set of packets.

14. The apparatus of claim 11, wherein the means for coding the plurality of packets comprises:
    means for determining a number of packets (k) in the plurality of packets; and
    means for coding the k packets using the determined code to generate a number of packets (m) in the coded set of packets, m being greater than k.

15. The apparatus of claim 14, wherein the means for coding comprises:
    means for determining the number of packets (m) in the coded set of packets so that a subset of the coded set of packets with at least k packets is sufficient to recover the k packets in the plurality of packets.

16. The apparatus of claim 14, further comprising:
    means for transmitting k, m and the determined code via the communications network.

17. The apparatus of claim 14, wherein the means for coding comprises:
    means for determining the number of packets (m) in the coded set of packets based at least in part on an overhead associated with transmitting the plurality of hashes via the communications network.

18. The apparatus of claim 14, further comprising:
    means for randomly selecting at least one packet of the coded set of packets;

wherein the means for coding comprises:
means for determining the number of packets (m) in the coded set of packets based at least in part on an overhead associated with the broadcasting of the at least one randomly selected packet over the wireless communications network.

19. A device configured for secure content distribution for wireless communications, comprising:
a processor;
memory in electronic communication with the processor; and
instructions being stored in the memory, the instructions being executable by the processor to:
identify a plurality of packets comprising content to be delivered;
code a plurality of packets using a determined code to generate a coded set of packets,
hash a plurality of packets of the coded set of packets to generate a plurality of hashes;
transmit the plurality of hashes via a communications network; and
transmit each packet of the coded set of packets after transmitting the plurality of hashes, wherein the instructions to transmit each packet of the coded set of packets comprises instructions to:
select at least one packet of the coded set of packets;
broadcast the at least one selected packet over a wireless communications network independently of transmitting the plurality of hashes; and
repeat the selecting and the broadcasting until each packet of the coded set of packets has been broadcasted.

20. A method of secure content distribution for wireless communications, comprising:
receiving a plurality of hashes corresponding to a coded set of packets of content to be delivered from a first device;
receiving, via a broadcast transmission independently of receiving the plurality of hashes, a packet of the coded set of packets of content to be delivered;
verifying the received packet based at least in part on the received plurality of hashes;
decoding the received packet after verifying the received packet based at least in part on the received plurality of hashes; and
repeating receiving a packet of the coded set of packets, verifying the received packet, and decoding the received packet until the content to be delivered has been decoded.

21. The method of claim 1, wherein transmitting the plurality of hashes via the communications network comprises transmitting the plurality of hashes via a dedicated short range communications (DSRC) network.

22. The method of claim 1, further comprising:
obtaining a certificate revocation list created by a certificate authority, the certificate revocation list comprising the plurality of packets to be coded.

23. The method of claim 1, further comprising, before transmitting the plurality of hashes, at least one of:
signing the plurality of hashes with an electronic signature, or
encrypting the plurality of hashes.

24. The apparatus of claim 11, wherein the means for transmitting the plurality of hashes via the communications network comprises means for transmitting the plurality of hashes via a dedicated short range communications (DSRC) based network.

25. The apparatus of claim 11, further comprising:
means for obtaining a certificate revocation list created by a certificate authority, the certificate revocation list comprising the plurality of packets to be coded.

26. The apparatus of claim 11, further comprising at least one of:
means for signing the plurality of hashes with an electronic signature before transmitting the plurality of hashes, or
means for encrypting the plurality of hashes before transmitting the plurality of hashes.

27. The method of claim 20, wherein the packet of the coded set of packets is received from a second device, different from the first device.

28. The method of claim 20, further comprising:
receiving an electronic signature associated with the plurality of hashes;
verifying the received plurality of hashes based at least in part on the received electronic signature; and
forwarding, to another device, the plurality of hashes with the received electronic signature.

29. The method of claim 28, wherein the forwarding the verified plurality of hashes with the received electronic signature comprises:
forwarding a code by which the coded set of packets are coded, a number of packets (k) in a plurality of packets that are coded to generate a number of packets (m), and the number of packets (m).

30. The method of claim 28, wherein the verified plurality of hashes are forwarded with the received electronic signature via a dedicated short range communications (DSRC) based network.

* * * * *